US011966341B1

(12) United States Patent
Boenapalli et al.

(10) Patent No.: US 11,966,341 B1
(45) Date of Patent: Apr. 23, 2024

(54) HOST PERFORMANCE BOOSTER L2P HANDOFF

(71) Applicant: QUALCOMM Incorporated, San Diego, CA (US)

(72) Inventors: Madhu Yashwanth Boenapalli, Hyderabad (IN); Surendra Paravada, Hyderabad (IN); Sai Praneeth Sreeram, Anantapur (IN)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 18/054,249

(22) Filed: Nov. 10, 2022

(51) Int. Cl.
*G06F 12/1009* (2016.01)

(52) U.S. Cl.
CPC .. *G06F 12/1009* (2013.01); *G06F 2212/1028* (2013.01); *G06F 2212/655* (2013.01)

(58) Field of Classification Search
CPC ......... G06F 12/1009; G06F 2212/1028; G06F 2212/655
See application file for complete search history.

(56) References Cited

U.S. PATENT DOCUMENTS

| 11,544,159 | B2 * | 1/2023 | Paley | G06F 11/1469 |
| 2014/0181558 | A1 * | 6/2014 | Taha | G06F 1/3206 |
| | | | | 713/323 |
| 2015/0331624 | A1 * | 11/2015 | Law | G06F 3/0652 |
| | | | | 711/103 |
| 2015/0355704 | A1 * | 12/2015 | Grimsrud | G06F 1/3206 |
| | | | | 713/323 |
| 2019/0042460 | A1 * | 2/2019 | Trika | G06F 12/0246 |
| 2020/0117599 | A1 * | 4/2020 | Golov | G05D 1/0212 |
| 2022/0236916 | A1 * | 7/2022 | Esaka | G06F 3/0616 |

* cited by examiner

Primary Examiner — Sean D Rossiter
(74) Attorney, Agent, or Firm — The Marbury Law Group/Qualcomm

(57) ABSTRACT

Methods that may be performed by a host controller of a computing device for synchronizing logical-to-physical (L2P) tables before entering a hibernate mode are disclosed. Embodiment methods may include determining whether a first L2P table stored in a dynamic random-access memory (DRAM) communicatively connected to the host controller is out of synchronization with a second L2P table stored in a static random-access memory (SRAM) of a universal flash storage (UFS) device communicatively connected to the host controller via a link. If the first and second L2P tables are out of synch, the host controller may retrieve at least one modified L2P map entry from the second L2P table when the UFS device is configured to enter a hibernate mode from the UFS device, and update the first L2P tabled with the at least one modified L2P map entry before the link and the UFS device enter the hibernate mode.

30 Claims, 10 Drawing Sheets

Legend for FIGS. 4A-4D
- (1) Read command
- (2) Retrieve L2P map entry
  - (2a) read L2P map entry from NAND and store in SRAM
  - (2b) retrieve L2P map entry from SRAM
  - (2c) retrieve L2P map entry from Host memory (DRAM)
- (3) Read the logical block data from NAND and transfer to host
- tR = NAND read latency 400a Legacy L2P Cache-Hit

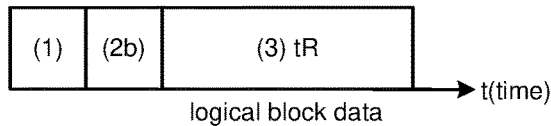

Legacy L2P Cache-Miss

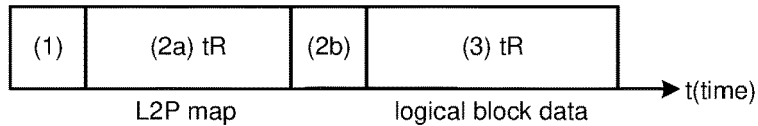

HPB L2P Cache-Hit

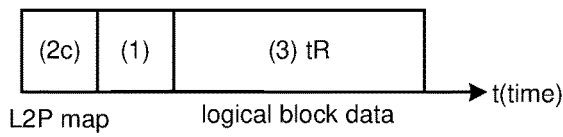

HPB L2P Cache-Miss due to device maintenance activities

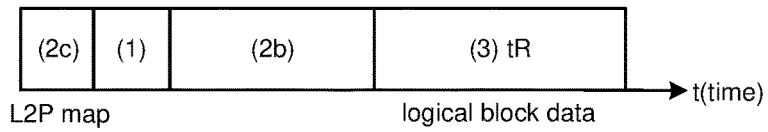

FIG. 4D

Legend for FIGS. 5A, 5B
- (1) Read command
- (2) Retrieve L2P map entry
  - (2a) read L2P map entry from NAND and store in SRAM
  - (2b) retrieve L2P map entry from SRAM
  - (2c) retrieve L2P map entry from Host memory (DRAM)
- (3) Read the logical block data from NAND and transfer to host
- tR = NAND read latency
- (4) Link startup and UFS wakeup

500a

L2P Tables out of sync & UFS is set hibernation mode

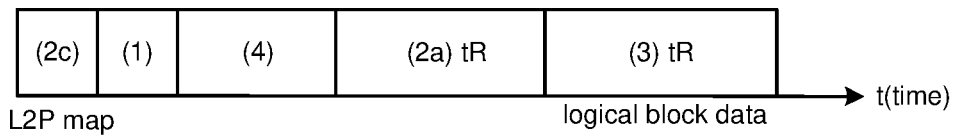

Total Read Time (Tr) = [ (2c) + (1) + (4) + (2a) tR + (3) tR ]

Host syncs the modified L2P entries before hibernating the UFS device

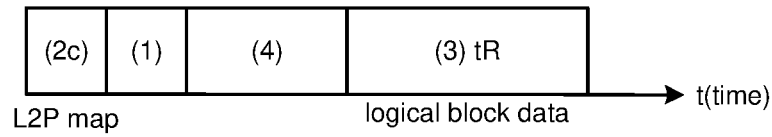

Total Read Time (Tr) = [ (2c) + (1) + (4) + (3) tR ]

FIG. 5B

HOST PERFORMANCE BOOSTER L2P HANDOFF

BACKGROUND

An increased number of computing devices are being developed that require or support high-performance operations. As a result of implementing increasingly complex processors, power consumption within these devices has increased. Increased power consumption is especially problematic in smaller devices, such as wearable devices or smart phones that are battery-powered. In an effort to conserve power and/or battery life, some components of a computing device may be configured to enter a hibernation mode, in which little or no power is provided to these components. When the components are again required for any processing operations, the components are woken from hibernation, and may perform various operations until they are no longer needed. These components may alternate between hibernation and active modes at high rates to minimize power consumption. However, hibernating and activating certain components at high rates may be problematic if the components are used for storing data. For example, memory storage devices communicably coupled to a system-on-a-chip (SoC), such as universal flash storage (UFS) may become unsynchronized with other memory storage devices utilized by an SoC, such as dynamic random-access memory (DRAM). This may result in the DRAM storing data that no longer reflective of the data in the UFS, and may increase latency of memory read operations necessary to resynchronize data at each memory device.

SUMMARY

Various aspects include methods and a host controller of a computing device performing the methods for synchronizing logical-to-physical (L2P) tables. Various aspects may include determining whether a first L2P table stored in a dynamic random-access memory (DRAM) communicatively connected to the host controller is out of synchronization with a second L2P table stored in a static random-access memory (SRAM) of a universal flash storage (UFS) device communicatively connected to the host controller via a link, determining whether the UFS device is configured to enter a hibernate mode in response to determining that the first L2P table is out of synchronization with the second L2P table, retrieving at least one modified L2P map entry from the UFS device in response to the UFS device being configured to enter the hibernate mode, in which the at least one modified L2P map entry is stored within the second L2P table, updating the first L2P table with the at least one modified L2P map entry, and configuring the link and the UFS device to be in the hibernate mode.

In some aspects, determining whether the UFS device is configured to enter the hibernate mode further may include determining that the UFS device is configured to enter the hibernate mode further in response to a command queue of the host controller being empty.

In some aspects, determining whether the first L2P table is out of synchronization with the second L2P table further may include determining that the first L2P table is out of synchronization with the second L2P table in response to receiving a notification indicating that the first L2P table is out of synchronization with the second L2P table. In some aspects, retrieving the at least one modified L2P map entry from the UFS device further may include transmitting, from the host controller to a device controller of the UFS device, a read message configured to cause the device controller to read logical block data from a NOT-AND (NAND) flash memory within the UFS device, in which the logical block data is associated with the at least one modified L2P map entry, and receiving the logical block data from the device controller, in which updating the first L2P table with the at least one modified L2P map entry further may include updating the first L2P table based on the logical block data. In some aspects, the notification may further indicate at least one L2P map entry in the first L2P table that is not synchronized with the at least one L2P map entry in the second L2P table, the method may further include retrieving the at least one L2P map entry in the first L2P table identified by the notification, in which the read message includes the at least one L2P map entry of the first L2P table, and in which the device controller is configured to read the logical block data identified by the at least one L2P map entry of the first L2P table.

Some aspects may further include receiving a read request, configuring the link and the UFS device to be in an active mode in response to receiving the read request, and retrieving at least one subsequent modified L2P map entry from the UFS device.

Some aspects may further include updating the first L2P table with the at least one subsequent modified L2P map entry, and configuring the link and the UFS device to be in the hibernate mode.

Some aspects may further include setting a flag in response to updating the first L2P table with the at least one modified L2P map entry, in which the flag, when read by a processor of the computing device, indicates a successful synchronization of the first L2P table with the second L2P table.

Further aspects include a computing device including a host controller configured to perform operations of any of the methods summarized above. Further aspects include a computing device including means for performing functions of any of the methods summarized above. Further aspects include a host controller for use in a computing device, the host controller including a processor configured to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIGS. 4A-4D are timing diagrams illustrating conventional read command process timing diagrams.

FIGS. 5A, and 5B are timing diagrams illustrating read command process timing diagrams according to various embodiments.

DETAILED DESCRIPTION

Figure 1:
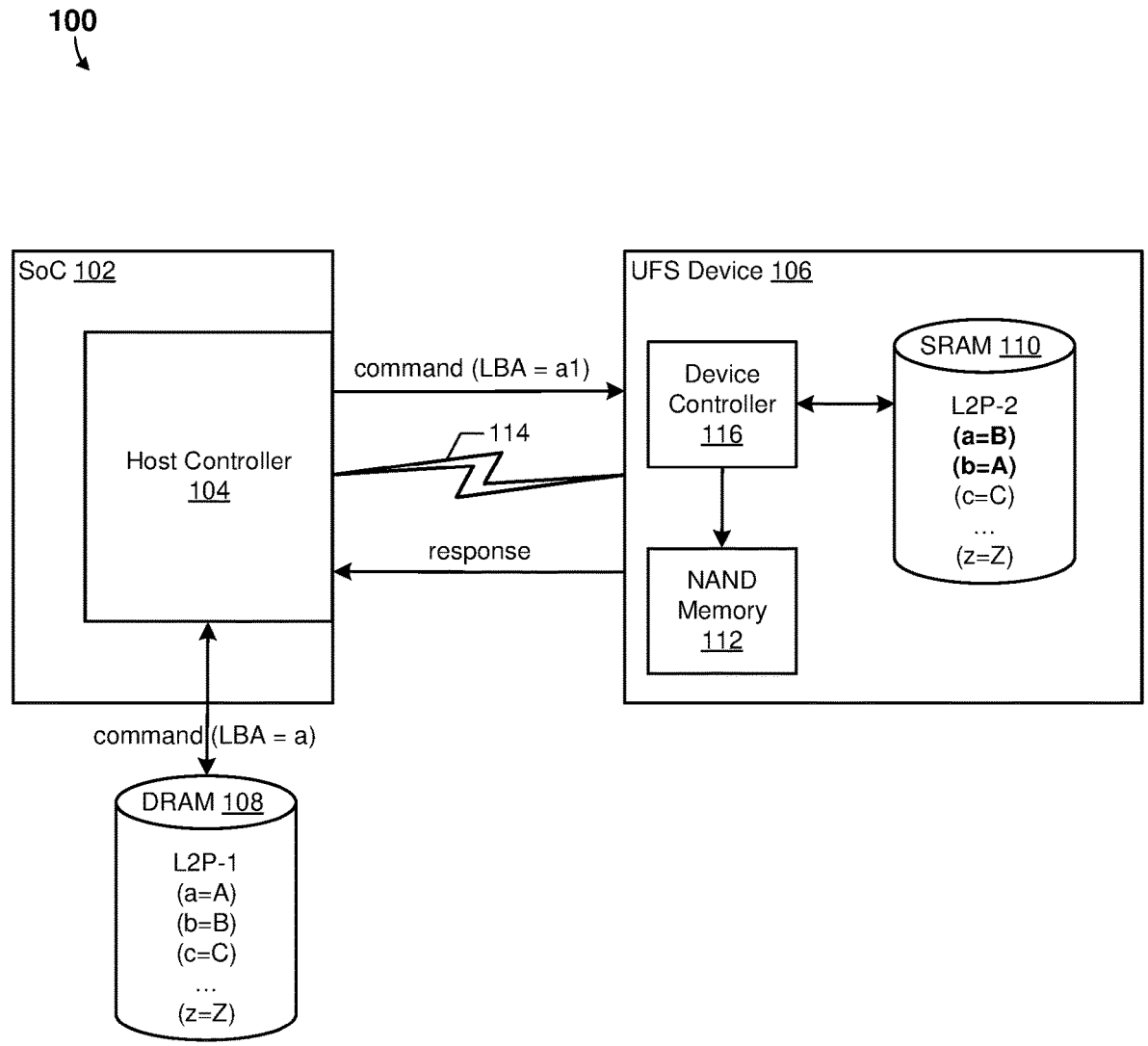
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments described herein include methods and computing devices including a host controller that facilitate synchronization between logical-to-physical (L2P) tables stored in a dynamic random-access memory (DRAM) communicatively connected to the host controller and stored in a static random-access memory (SRAM) of a universal flash storage (UFS) device communicatively connected to the host controller via a link. Various embodiments may determine that the L2P tables are out of synchronization and that the UFS device is about to enter a hibernation mode, and in response synchronize the L2P tables prior to configuring the UFS device in a hibernation mode.

The term "system-on-a-chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices.

The term "system-in-a-package" (SIP) may be used herein to refer to a single module or package that contains multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high-speed communication circuitry and packaged in close proximity, such as on a single motherboard or in a single computing device. The proximity of the SoCs facilitates high speed communications and the sharing of memory and resources.

An increased number of devices are being developed that require or support high-performance operations. As a result of implementing increasingly complex processors, power consumption within these devices has increased. Increased power consumption is especially problematic in smaller devices, such as wearable devices or smart phones that are battery-powered. Such devices may be configured in a host performance booster (HPB) mode that may utilize a host system memory (e.g., DRAM communicably connected to a host controller of an SoC) as a cache for flash transition layer (FTL) mapping table. FTL maintains an L2P mapping table in NOT-AND (NAND) flash memory of an UFS device connected to a host controller. By using HPB, L2P map entries can be read from host memory (i.e., DRAM) faster than from NAND flash memory located within the UFS device.

To reduce the power consumption of a device including a host controller within an SoC and a UFS device communicably connected to the SoC via the host controller, the host controller may hibernate the UFS device. For example, the host controller may hibernate the UFS device whenever there are no memory read operations in a queue, and may wake the UFS device when a read operation is received by the SoC. This process of hibernating and waking the UFS device may occur hundreds or thousands of times within a short period. Hibernating the UFS device whenever possible may be critical to conserving power, especially in high-performance modes such as HPB.

As the condition of a UFS device diminishes (i.e., through physical aging and usage amount), the data retention capability of the memory cells (e.g., NAND, SRAM) also becomes weaker, requiring frequent maintenance operations to retain the data within the memory cells. Memory refresh operations, such as Manual Force (MF) and Manual Selective (MS), may be performed to counteract this aging process and to retain data more accurately within the memory cells.

As the UFS device ages, its idle maintenance activities including refresh mechanisms increases, which causes frequent changes in its L2P table. Also as UFS age increases, refresh or idle maintenance operations of the UFS device increases, which may cause frequent changes in the L2P table of the UFS device. These frequent changes may cause the L2P table stored within the UFS device to become out of sync with the host's L2P table (i.e., L2P table stored within DRAM connected to the host controller). Frequent changes in the UFS device L2P table may increase the rate at which the host controller L2P table becomes out of synchronization with the UFS device L2P table. Due to aggressive power saving features, the UFS device may be hibernated multiple times within a given time window by the host controller, increasing the chance for the L2P tables to become unsynchronized. Frequently configuring the UFS device in a hibernation mode may further increase the rate at which the host controller L2P table becomes out of synchronization with the UFS device L2P table. Consequently, the UFS device may enter into a hibernate state more often due to aging and aggressive power saving features.

If a read operation is performed when the L2P table of the host is not synchronized with the L2P table of the UFS device (i.e., the L2P table of the host is not storing the latest data), the read operation will read incorrect data (i.e., a cache miss may occur or a cache hit may occur but respond to the read operation with out-of-date data). To ensure the correct and latest data is being read for each read operation, a device controller mode (DCM) (i.e., UFS initiates L2P table synchronization) or a host controller mode (HCM) (i.e., host controller initiates L2P table synchronization) may be utilized for each hibernation operation, causing increased latency during I/O requests from User-space. For example, the I/O must wait while the host controller exchanges the L2P details with the UFS device during a DCM or HCM. Additional latency may be observed when the UFS device is detached from the host controller, such as during an LU reset or endpoint reset. Thus, increased read latency may be introduced to a read operation received by the host controller due to DCM or HCM as UFS device age.

Various embodiments include methods for synchronizing L2P tables of a host (i.e., in DRAM communicably connected to a host controller) and a UFS device. Various embodiments may synchronize L2P tables prior to configuring the UFS device in a hibernation mode to ensure that the L2P table of the host contains the latest data stored in the L2P table of the UFS device. When the host controller receives a read operation, the host controller may wake the UFS device, read the latest L2P table data, and reconfigure the UFS device to enter the hibernate mode. Various embodiments may reduce overall read latency, as compared to reads performed during a conventional DCM or HCM, by ensuring the host L2P table has the latest L2P map entries as stored within the UFS device L2P table prior to hibernation of the UFS device.

Various embodiments include a method performed by a host controller (e.g., by a processor within the host controller) of a computing device for synchronizing L2P tables, including determining whether a first L2P table stored in a DRAM communicatively connected to the host controller is out of synchronization with a second L2P table stored in an SRAM of a UFS device communicatively connected to the host controller via a link. Embodiment methods may further include the host controller or a processor within the host controller determining whether the UFS is configured to enter a hibernate mode in response to determining that the first L2P table is out of synchronization with the second L2P table, retrieving at least one modified L2P map entry from the UFS in response to the UFS being configured to enter the hibernate mode, in which the at least one modified L2P map entry is stored within the second L2P table, updating the first L2P table with the at least one modified L2P map entry, and configuring the link and the UFS to be in the hibernate mode.

FIG. 1 is a system block diagram illustrating an example system suitable for implementing any of the various embodiments. The system 100 may include one or more computing devices or processors for performing L2P table synchronization during an HPB. For example, the system 100 may include an SoC 100 including a host controller 104, a DRAM 108 communicably connected to the host controller 104, and a UFS device 106 communicably connected to the host controller 104 via a link 114. The host controller 104 may include a processor (not shown separately) configured to perform operations of the host controller described herein. The UFS device 106 may include a device controller 116, an SRAM 110, and a NAND memory 112. The device controller 116 may be coupled to the SRAM 110 and the NAND memory 112, such that the device controller 116 may interface L2P mapped entries (i.e., data) of the L2P-2 table between the NAND memory 112 and the SRAM 110.

The host controller 104 may receive read commands from other components of the SoC 102 and/or from components communicably connected to the SoC 102 (e.g., via I/O of the SoC). If the L2P tables, L2P-1 of the DRAM 108 and L2P-2 of the SRAM 110 are synchronized, the host controller 104 may read the data requested by the read command from the DRAM 108, and the DRAM 108 may provide the host controller 104 with the requested data. If the L2P tables, L2P-1 and L2P-2 are not synchronized, the host controller 104 may read the data requested by the read command from the UFS device 106 in a DCM or HCM, such that the host controller 104 is requesting the latest L2P map entries for unsynchronized L2P map entries of the L2P-1 table associated with the current read command. The host controller 104 may transmit a DCM/HCM-based read command to the device controller 116, and the device controller 116 may retrieve the requested L2P map entry or entries from either the NAND memory 112 or the L2P-2 table of the SRAM 110. The device controller 116 may then transmit a read response message to the host controller 104 for further processing. Such further processing may include transmitting the L2P map entry or entries that were received from the device controller 116 to the source device that generated the original read request, and/or updating the L2P-1 table of the DRAM 108 with the L2P map entry or entries received from the device controller 116.

When there are no read commands present in the command queue (CMDQ), the UFS device 106 may be configured in a hibernation mode to conserve power. Conventionally, the UFS device 106, regardless of whether the L2P tables are synchronized, would be configured to enter into a hibernation mode for power conservation purposes, resulting in unsynchronized L2P tables that persist at least through to the next wake-up of the UFS device 106. Various embodiments prevent this by synchronizing the L2P tables prior to hibernation of the UFS device 106.

Prior to the host controller 104 configuring the UFS device 106 to enter a hibernation mode and if the L2P-1 table of the DRAM 108 and the L2P-2 table of the SRAM 110 if L2P tables are not already synchronized, the host controller 104 may perform operations to synchronize the L2P tables. For example, as illustrated, the L2P-1 table of the DRAM 108 includes L2P map addresses and ranges "a" through "z" with corresponding data at each map entry "A" through "Z." SRAM 110 includes equivalent L2P map addresses and ranges "a" through "z" with corresponding data at each map entry. However, the L2P-1 table at memory addresses "a" and "b" store values "A" and "B" respectively, while the L2P-2 table memory addresses "a" and "b" store values "B" and "A" respectively. Thus, the L2P-1 table does not include the latest L2P map entries, and the L2P tables are therefore not synchronized. Lack of synchronization between L2P tables may be the result of the SRAM 110 performing memory refresh maintenance operations during which L2P map entries may be modified.

The host controller 104 may be aware of the lack of synchronization between the L2P tables. In some embodiments, the host controller 104 may manage a flag or bit, or series of flags or bits, indicating that the L2P tables are not synchronized. In some embodiments, the flag(s) or bit(s) may indicate which of the L2P map entries of the L2P-1 map are out-of-date and not synchronized. In some embodiments, the host controller 104 may receive (e.g., from another component within the SoC 102) a notification indicating that the L2P tables are not synchronized. In some embodiments, the notification received by the host controller 104 may indicate which of the L2P map entries of the L2P-1 map are out-of-date and not synchronized.

As in the aforementioned example in which the L2P map entries at address locations "a" and "b" of both L2P tables are not synchronized, the host controller 104 may perform operations to synchronize any differing L2P entries prior to configuring the UFS device in hibernation mode. For example, the host controller 104, being aware of which L2P map entries are not synchronized, may transmit a read command including a logical block address (LBA) (e.g., a1) to the device controller 116. The device controller 116 may read, from the NAND memory 112, an L2P map entry (e.g., B) corresponding to the LBA in the read command received from the host controller 104. The device controller 116 may then transmit, via a read response, the L2P map entry to the host controller 104. The host controller 104 may then update the L2P-1 table at the corresponding L2P map address (e.g., a) with the L2P map entry (e.g., B) in the read response message received from the device controller 116.

In some embodiments, the read command transmitted to the device controller 116 from the host controller 104 may request one L2P map entry of a L2P map address of the L2P-1 table that is not synchronized with the L2P-2 table. In some embodiments, the read command transmitted to the device controller 116 from the host controller 104 may request multiple or all L2P map entries of multiple or all L2P map address of the L2P-1 table that are not synchronized with the L2P-2 table. For example, the host controller 104 may request L2P map entries at address locations "a" and "b" from the L2P-2 table, and then update the L2P-1 table memory addresses "a" and "b" with the L2P-2 map entries "B" and "A" respectively. Thus, the synchronization process performed prior to hibernation of the UFS device 106 may synchronize some or all of the unsynchronized memory address locations of the L2P-1 table.

The host controller 104 may configure the link 114 and the UFS device 106 to be in a hibernation mode by cutting off power to power rails of the NAND memory 112 (e.g., set VCC to zero) and the device controller 116 (e.g., set VCCQ/VCCQ2 to zero).

Figure 2:
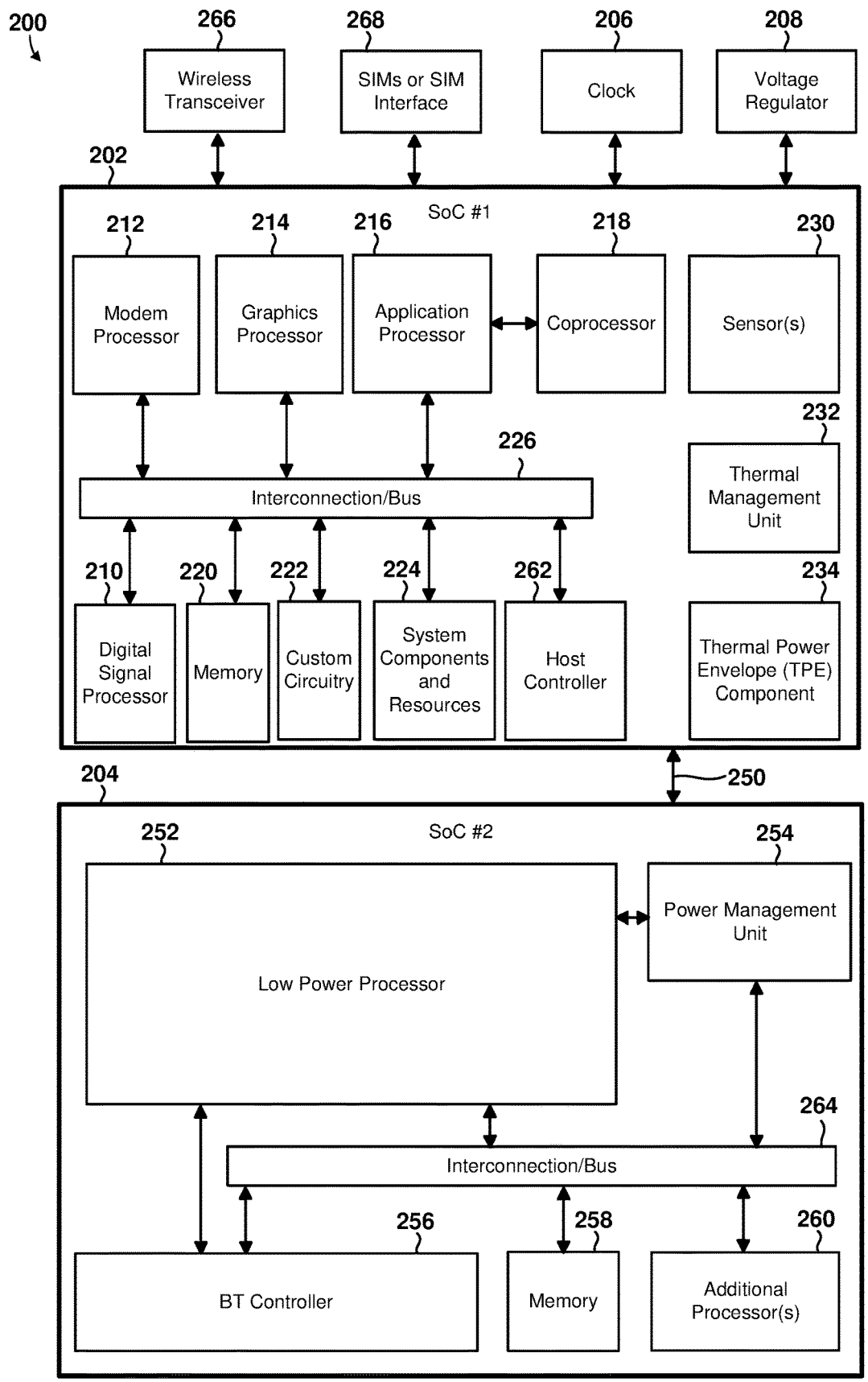
FIG. 2 is a component block diagram illustrating an example computing device suitable for implementing any of the various embodiments.

FIG. 2 is a component block diagram illustrating an example computing device 200 suitable for implementing any of the various embodiments. Various embodiments may be implemented on a number of single processor and multiprocessor computer systems, including a system-on-chip (SoC) or system in a package.

With reference to FIGS. 1-2, the illustrated example computing device 200 (which may be a system-in-a-package in some embodiments) includes a two SoCs 202, 204 coupled to a clock 206, a voltage regulator 208, at least one subscriber identity module (SIM) 268 and/or a SIM interface and a wireless transceiver 266 configured to send and receive wireless communications via an antenna (not shown) to/from wireless computing devices, such as a base station, wireless device, and/or computing device (e.g., 100). In some embodiments, the first SoC 202 may operate as central processing unit (CPU) of the computing device 200 that carries out the instructions of software application programs by performing the arithmetic, logical, control and input/output (I/O) operations specified by the instructions. In some embodiments, the second SoC 204 may operate as a specialized processing unit. For example, the second SoC 204 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SoC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, a host controller 262 (e.g., host controller 104), an interconnection/bus module 226, one or more sensors 230 (e.g., accelerometer, temperature sensor, pressure sensor, optical sensor, infrared sensor, analog sound sensor, etc.), a thermal management unit 232, and a thermal power envelope (TPE) component 234. The second SoC 204 may include a low power processor 252, a power management unit 254, an interconnection/bus module 264, a BT controller 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SoC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SoC 202, 204 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the system components and resources 224 of the first SoC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SoC 202, 204 may communicate via interconnection/bus module 250. In some embodiments, the interconnection/bus module may be a connection established by transceiving (i.e., receiving and transmitting) components within both the SoC 202 and SoC 204. For example, the low power processor 252 may include a universal asynchronous receiver-transmitter (UART) and the application processor 216 may include a multiple signal messages (MSM) UART driver that is communicatively connected to the UART of the low power processor 252.

The various processors 210, 212, 214, 216, 218, may be interconnected to one or more memory elements 220, system components and resources 224, and custom circuitry 222, and a thermal management unit 232 via an interconnection/bus module 226. Similarly, the low power processor 252 may be interconnected to the power management unit 254, the BT controller 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SoCs 202, 204 may further include an input/output module (not illustrated) for communicating with resources external to the SoC, such as a clock 206, a voltage regulator 208, one or more wireless transceivers 266, and at least one SIM 268 and/or SIM interface (i.e., an interface for receiving one or more SIM cards). Resources external to the SoC (e.g., clock 206, voltage regulator 208)

may be shared by two or more of the internal SoC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example computing device 200 discussed above, various embodiments may be implemented in a wide variety of computing systems, which may include a single processor, multiple processors, multicore processors, or any combination thereof.

In some embodiments, the various processors of the SoC 202 and SoC 204 may be located within a same SoC. For example, the application processor 216 and low power processor 252 may be located within a same SoC, such as in a single SoC of a wearable device, to perform L2P table synchronization functions.

Figure 3:
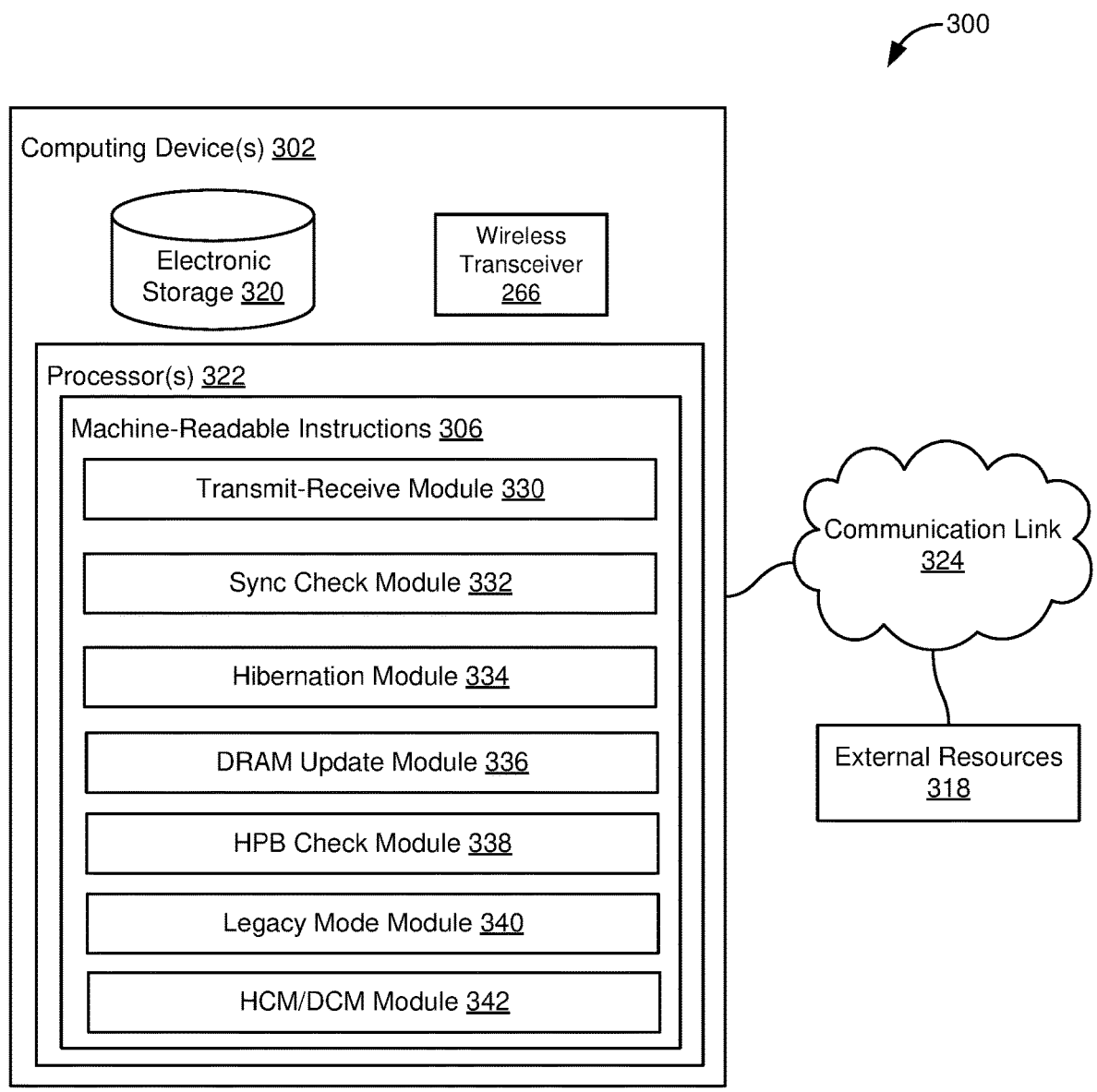
FIG. 3 is a component block diagram illustrating an example system configured to synchronize L2P tables according to some embodiments.

FIG. 3 is a component block diagram illustrating an example system 300 configured to synchronize L2P tables according to some embodiments. With reference to FIGS. 1-3, the system 300 may include one or more computing device(s) 302 (e.g., 100, 200) and external resources 318, which may communicate via a communication link 324 (e.g., link 114). External resources 318 may include sources of information outside of the system 300, external entities participating with the system 300, or other resources. For example, external resources 318 may be a computing device that may transmit read requests to the computing device(s) 302. In some implementations, some or all of the functionality attributed herein to external resources 318 may be provided by resources included in the system 300. The system 300 may include a plurality of hardware, software, and/or firmware components operating together to provide the functionality attributed herein to the processor 322.

The computing device(s) 302 may include electronic storage 320 that may be configured to store information related to functions implemented by a transmit-receive module 330, a sync check module 332, a hibernation module 332, a DRAM update module 336, an HPB check module 338, a legacy mode module 340, an HCM/DCM module 342, and any other instruction modules.

The electronic storage 320 may include non-transitory storage media that electronically stores information. The electronic storage 320 may include one or both of system storage that is provided integrally (i.e., substantially non-removable) with the system 200 and/or removable storage that is removably connectable to the system 200 via, for example, a port (e.g., a universal serial bus (USB) port, a firewire port, etc.) or a drive (e.g., a disk drive, etc.).

In various embodiments, electronic storage 320 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The electronic storage 320 may include one or more virtual storage resources (e.g., cloud storage, a virtual private network, and/or other virtual storage resources). The electronic storage 320 may store software algorithms, information determined by processor(s) 322, and/or other information that enables the system 300 to function as described herein.

The computing device(s) 302 may be configured by machine-readable instructions 306. Machine-readable instructions 306 may include one or more instruction modules. The instruction modules may include computer program modules. The instruction modules may include one or more of the transmit-receive module 330, the sync check module 332, the hibernation module 332, a DRAM update module 336, the HPB check module 338, the legacy mode module 340, the HCM/DCM module 342, and other instruction modules (not illustrated). The computing device(s) 302 may include processor(s) 322 configured to implement the machine-readable instructions 306 and corresponding modules.

The processor(s) 322 may include one of more local processors that may be configured to provide information processing capabilities in the system 300. As such, the processor(s) 322 may include one or more of a digital processor, an analog processor, a digital circuit designed to process information, an analog circuit designed to process information, a state machine, and/or other mechanisms for electronically processing information. Although the processor(s) 322 is shown in FIG. 3 as a single entity, this is for illustrative purposes only. In some embodiments, the processor(s) 322 may include a plurality of processing units. These processing units may be physically located within the same device, or the processor(s) 322 may represent processing functionality of a plurality of devices distributed in the system 300.

In some embodiments, the processor(s) 322 executing the transmit-receive module 330 may be configured to retrieve at least one modified L2P map entry from the UFS in response to the UFS being configured to enter the hibernate mode. In some embodiments, the processor(s) 322 executing the transmit-receive module 330 may be configured to transmit, from the host controller to a device controller of the UFS, a read message configured to cause the device controller to read logical block data from a NOT-AND (NAND) flash memory within the UFS. In some embodiments, the processor(s) 322 executing the transmit-receive module 330 may be configured to receive the logical block data from the device controller. In some embodiments, the processor(s) 322 executing the transmit-receive module 330 may be configured to retrieve the at least one L2P map entry in the first L2P table identified by the notification. In some embodiments, the processor(s) 322 executing the transmit-receive module 330 may be configured to receive a read request. In some embodiments, the processor(s) 322 executing the transmit-receive module 330 may be configured to retrieve at least one subsequent modified L2P map entry from the UFS.

In some embodiments, the processor(s) 322 executing the sync check module 332 may be configured to determine whether a first L2P table stored in a DRAM communicatively connected to the host controller is out of synchronization with a second L2P table stored in an SRAM of a UFS device communicatively connected to the host controller via a link. In some embodiments, the processor(s) 322 executing the sync check module 332 may be configured to set a flag in response to updating the first L2P table with the at least one modified L2P map entry In some embodiments, the processor(s) 322 executing the hibernation module 334 may be configured to determine whether the UFS is configured to enter a hibernate mode in response to determining that the first L2P table is out of synchronization with the second L2P table. In some embodiments, the processor(s) 322 executing the hibernation module 334 may be configured to configure the link and the UFS to be in an active mode in response to receiving the read request. In some embodiments, the processor(s) 322 executing the hibernation module 334 may be configured to configure the link and the UFS to be in the hibernate mode.

In some embodiments, the processor(s) 322 executing the DRAM update module 336 may be configured to update the first L2P table with the at least one modified L2P map entry. In some embodiments, the processor(s) 322 executing the DRAM update module 336 may be configured to update the first L2P table with the at least one subsequent modified L2P map entry.

In some embodiments, the processor(s) 322 executing the HPB check module 338 may be configured to determine whether HPB is enabled.

In some embodiments, the processor(s) 322 executing the legacy mode module 340 may be configured to perform legacy mode L2P table synchronization operations.

In some embodiments, the processor(s) 322 executing the HCM/DCM module 342 may be configured to perform L2P table synchronization in an HCM or DCM.

The description of the functionality provided by the different modules 330-342 is for illustrative purposes, and is not intended to be limiting, as any of modules 330-342 may provide more or less functionality than is described. For example, one or more of modules 330-342 may be eliminated, and some or all of its functionality may be provided by other ones of modules 330-342. As another example, processor(s) 322 may execute one or more additional modules that may perform some or all of the functionality attributed below to one of modules 330-342.

In some embodiments, the transmit-receive module 330, the sync check module 332, the hibernation module 332, the DRAM update module 336, the HPB check module 338, the legacy mode module 340, and the HCM/DCM module 342, may be implemented by a host controller (e.g., 104) of the computing device(s) 302.

FIGS. 4A-4D are timing diagrams 400a-400d illustrating conventional read command process timing diagrams. With reference to FIGS. 1-4D, a legend is provided indicating various read operations. A "(1)" may indicate the time to read (e.g., read request transmit by host controller 104 to device controller 116), a "(2a)" may indicate the time to read an L2P map entry from NAND (e.g., NAND memory 112) and store the read L2P map entry in SRAM (e.g., SRAM 110), a "(2b)" may indicate the time to retrieve of an L2P map entry from SRAM, a "(2c)" may indicate the time to retrieve an L2P map entry from Host memory (e.g., DRAM 108), a "(3)" may indicate the time to read the logical block data from NAND and transfer to host, and "tR" may indicate a NAND read latency.

FIG. 4A illustrates the time to process a legacy L2P cache-hit, including a total time to process (1), (2b), and (3) tR.

FIG. 4B illustrates the time to process a legacy L2P cache-miss, including a total time to process (1), (2a) tR, (2b), and (3) tR.

FIG. 4C illustrates the time to process an HPB L2P cache-hit including a total time to process (2c), (1), and (3) tR. This may be performed during an HPB mode.

FIG. 4D illustrates the time to process an HPB L2P cache-miss due to maintenance activities, including a total time to process (2c), (1), (2b), and (3) tR. This may be performed during an HPB mode.

Various embodiments may reduce latency as compared to conventional read commands by eliminating a need to perform operations related to (2b) during which an L2P map entry is retrieved from SRAM as opposed to NAND memory.

FIGS. 5A, and 5B are timing diagrams 500a and 500b illustrating read command process timing diagrams according to various embodiments. With reference to FIGS. 1-5B, a legend is provided indicating various read operations. A "(4)" may indicate the time for the host controller (e.g., 104) to configure a link (e.g., 114) in a startup configuration and a UFS device (e.g., 106) in an awake configuration (i.e., not in hibernation mode).

FIG. 5A illustrates a read command process timing diagram for when L2P tables (e.g., L2P-1, L2P-2) are out of synchronization and the UFS is set to hibernation mode. A sequence of processes to synchronize the L2P tables may be a total read time including (2c), (1), (4), (2a) tR, and (3) tR.

FIG. 5B illustrates a read command process timing diagram for when a host (e.g., host controller 104) synchronizes the modified L2P map entries before hibernating the UFS device (e.g., UFS device 106). A sequence of processes to synchronize the L2P tables may be a total read time including (2c), (1), (4), and (3) tR.

The various scenarios in which the operations of read command process timing diagrams 500a and 500b are performed for synchronizing the L2P tables prior to UFS hibernation eliminate the need to perform operation (2b) in which L2P map entries are retrieved directly from the SRAM (e.g., SRAM 110) of the UFS, therefore reducing overall latency to process various read commands.

The operations of the read command process timing diagrams 500a and 500b may be performed when various conditions are satisfied, including (i) the L2P tables being out of synchronization, and (ii) the device is about to be configured in a hibernation mode. When these conditions are met, the host controller 104 may perform additional operations to synchronize the L2P tables: when the L2P tables are out of synchronization and the host controller 104 is notified about out-of-sync status, and if aggressive power saving features are enacted, then the host controller 104 may enable the pHPBmode=01h, retrieve the modified L2P entries, and cut off the power of UFS device 106; and/or whenever read requests appears at the host controller 104, the host controller 104 simply may enable the link 114 and then wake up the UFS device 106 and read the data modified L2P map entries from the NAND memory 112.

Figure 6A:
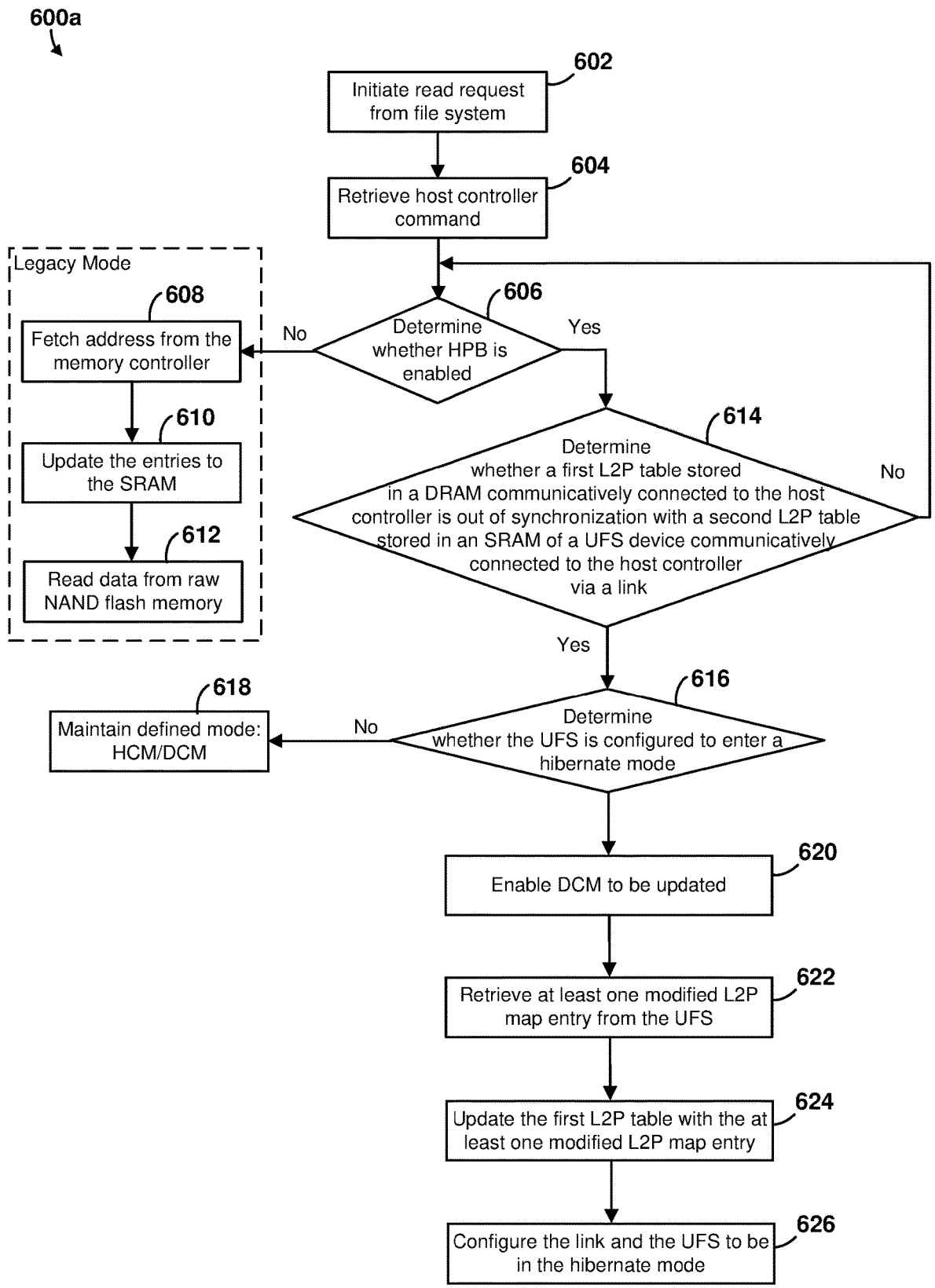
FIG. 6A is a process flow diagram of an example method that may be performed by a host controller of a computing device for synchronizing L2P tables in accordance with various embodiments.

FIG. 6A is a process flow diagram of an example method 600a that may be performed by a host controller (e.g., by a processor within the host controller) of a computing device for synchronizing L2P tables in accordance with various embodiments. FIGS. 6B-6E are process flow diagrams of example operations 600b-600e that may be performed as part of the method 600a as described for synchronizing L2P tables in accordance with some embodiments. With reference to FIGS. 1-6E, the method 600a and the operations 600b-600e may be performed by a host controller (e.g., 104, 262) of a computing device (e.g., 102, 200, 302). In some embodiments, the host controller (e.g., 104, 262) may include a processor configured to perform the operations by processor-executable instructions stored in a non-transitory processor-readable medium (e.g., 108, 220, 258, 320). Means for performing the operations of the method 600a and the operations 600b-600e may be a processor of the systems 100, 200, and 300 such as the processors 102, 252, 322, and/or the like as described with reference to FIGS. 1-6E.

In block 602, the host controller (e.g., 104, 262) of the computing device may (e.g., 102, 200, 302) perform operations including initiating read request from a file system. The read request initiation may include configuring the host controller to receive read requests (e.g., from a component of the SoC 102, 202 or a component or device communicatively connected to the SoC 102, 202 via I/O interface). Means for performing the operations of block 602 may include a host controller (e.g., 104, 262) of a computing device may (e.g., 102, 200, 302) executing the transmit-receive module 330.

In block 604, the host controller (e.g., 104, 262) of the computing device (e.g., 102, 200, 302) may perform operations including retrieving a host controller command. Means for performing the operations of block 604 may include a host controller (e.g., 104, 262) of a computing device may (e.g., 102, 200, 302) executing the transmit-receive module 330.

In determination block 606, the host controller (e.g., 104, 262) of the computing device (e.g., 102, 200, 302) may perform operations including determining whether HPB is enabled. Means for performing the operations of determination block 606 may include a host controller (e.g., 104, 262) of a computing device may (e.g., 102, 200, 302) executing the HPB check module 338.

In response to determining that HPB is not enabled (i.e., determination block 606="No"), the host controller may perform memory read legacy operations in blocks 608, 610, and 612. For example, in block 608, the host controller may fetch an address corresponding to a read request from a memory controller (e.g., of the SoC 102, 202). In block 610, the host controller may update the L2P map entries in the SRAM (e.g., 110). In block 612, the host controller, via a device controller (e.g., 116) may read raw data from a NAND flash memory (e.g., 112). For example, read operations may be performed according to the timing diagrams 400a and 400b. Means for performing the operations of blocks 608, 610, and 612 may include a host controller (e.g., 104, 262) of a computing device may (e.g., 102, 200, 302) executing the legacy mode module 340.

In response to determining that HPB is enabled (i.e., determination block 606="Yes"), the host controller may determine whether a first L2P table (e.g., L2P-1) stored in a DRAM (e.g., 108) communicatively connected to the host controller is out of synchronization with a second L2P table (e.g., L2P-2) stored in an SRAM (e.g., 110) of a UFS device (e.g., 106) communicatively connected to the host controller via a link (e.g., 114) in determination block 614. In some embodiments, determining whether the first L2P table is out of synchronization with the second L2P table may further include determining that the L2P table is out of synchronization with the second L2P table in response to receiving a notification (e.g., from a component of the SoC 102, 202) indicating that the first L2P table is out of synchronization with the second L2P table. In some embodiments, the host controller may manage flag(s) or bit(s) indicating whether the L2P tables are synchronized or unsynchronized. Means for performing the operations of determination block 614 may include a host controller (e.g., 104, 262) of a computing device may (e.g., 102, 200, 302) executing the sync check module 332.

In response to determining that a first L2P table (e.g., L2P-1) stored in a DRAM (e.g., 108) communicatively connected to the host controller is not out of synchronization (i.e., in sync) with a second L2P table (e.g., L2P-2) stored in an SRAM (e.g., 110) of a UFS device (e.g., 106) communicatively connected to the host controller via a link (e.g., 114) (i.e., determination block 614="No"), the host controller may repeat performing determining whether HPB is enabled in determination block 606.

In response to determining that a first L2P table (e.g., L2P-1) stored in a DRAM (e.g., 108) communicatively connected to the host controller is out of synchronization with a second L2P table (e.g., L2P-2) stored in an SRAM (e.g., 110) of a UFS device (e.g., 106) communicatively connected to the host controller via a link (e.g., 114) (i.e., determination block 614="Yes"), the host controller may determine whether the UFS (e.g., 106) is configured to enter a hibernate mode in determination block 616. In some embodiments determining whether the UFS is configured to enter the hibernate mode may further include determining that the UFS is configured to enter the hibernate mode further in response to a command queue (e.g., CMDQ) of the host controller being empty. A command queue may be a block in the host controller in which all the data requests are placed (i.e., an empty command queue indicates no need access L2P tables of UFS and can therefore safely hibernate the UFS). Means for performing the operations of determination block 616 may include a host controller (e.g., 104, 262) of a computing device may (e.g., 102, 200, 302) executing the hibernation module 334.

In response to determining that the UFS (e.g., 106) is not configured to enter a hibernate mode (i.e., determination block 616="No"), the host controller may maintain the defined mode of either HCM or DCM in block 618. In HCM or DCM, the host controller or the device controller (e.g., 116) may initiate synchronization procedures. For example, read operations may be performed according to the timing diagrams 400c and 400c. In HCM, the host controller may drives synchronization of L2P tables (i.e., host is aware L2P tables are not in sync, then retrieves modified L2P map entries from device controller). In DCM, the device controller may manage L2P table synchronization, such that the device controller retrieves and transmits modified L2P map entries whenever there is an update to the L2P table (i.e., without receiving a request message for any updated entries from the host controller). Means for performing the operations of block 618 may include a host controller (e.g., 104, 262) of a computing device may (e.g., 102, 200, 302) executing the HCM/DCM module 342.

In response to determining that the UFS (e.g., 106) is configured to enter a hibernate mode (i.e., determination block 616="Yes"), the host controller may enable DCM to be updated in block 620. The DCM may be updated in response to a recent refresh maintenance operation. The device controller, managing the DCM, may maintain a history of (i) updated L2P table entries, and (ii) the last time the L2P table (e.g., L2P-2) was flushed to host controller. Means for performing the operations of block 620 may include a host controller (e.g., 104, 262) of a computing device may (e.g., 102, 200, 302) executing the HCM/DCM module 342.

In block 622, the host controller (e.g., 104, 262) of the computing device (e.g., 102, 200, 302) may perform operations including retrieving at least one modified L2P map entry from the UFS (e.g., 106) in response to the UFS being configured to enter the hibernate mode, in which the at least one modified L2P map entry is stored within the second L2P table (e.g., in NAND memory 112 and/or in L2P-2 of SRAM 110). In some embodiments, retrieving the at least one modified L2P map entry from the UFS may further include transmitting, from the host controller to a device controller (e.g., 116) of the UFS, a read message configured to cause the device controller to read logical block data from a NAND flash memory (e.g., NAND memory 112) within the UFS, in which the logical block data is associated with the at least one modified L2P map entry (i.e., in the L2P-2 table of the SRAM 110), and receiving the logical block data from the device controller. Means for performing the operations of block 622 may include a host controller (e.g., 104, 262) of a computing device may (e.g., 102, 200, 302) executing the transmit-receive module 330.

In block 624, the host controller (e.g., 104, 262) of the computing device (e.g., 102, 200, 302) may perform operations including updating the first L2P table (e.g., L2P-1) with the at least one modified L2P map entry. After receiving the modified L2P map entry or entries from the UFS (e.g., 106), the host controller may transmit a write command to the DRAM (e.g., 108) to cause the DRAM to overwrite the unsynchronized memory address locations, thereby synchronizing the first L2P with the second L2P table. In some embodiments, the host controller may update only active regions (i.e., memory regions corresponding to the modified L2P map entries) and may not update inactive regions (i.e., L2P map entries that were not modified in the UFS). In some embodiments, updating the first L2P table with the at least one modified L2P map entry may further include updating the first L2P table based on the logical block data in modified regions of the second L2P table. Means for performing the operations of block 624 may include a host controller (e.g., 104, 262) of a computing device may (e.g., 102, 200, 302) executing the DRAM update module 336.

In block 626, the host controller (e.g., 104, 262) of the computing device (e.g., 102, 200, 302) may perform operations including configuring the link (e.g., 114) and the UFS (e.g., 106) to be in the hibernate mode. The host controller may configure the link and the UFS to be in a hibernation mode by cutting off power to power rails of the NAND memory 112 (e.g., set VCC to zero) and the device controller 116 (e.g., set VCCQ/VCCQ2 to zero). Means for performing the operations of block 626 may include a host controller (e.g., 104, 262) of a computing device may (e.g., 102, 200, 302) executing the hibernation module 334.

FIG. 6A is a process flow diagram of an example method 600a that may be performed by a host controller of a computing device for synchronizing L2P tables in accordance with various embodiments. FIGS. 6B-6E are process flow diagrams of example operations 600b-600e that may be performed as part of the method 600a as described for synchronizing L2P tables in accordance with some embodiments. With reference to FIGS. 1-6E, the method 600a and the operations 600b-600e may be performed by a host controller (e.g., 104, 262) of a computing device (e.g., 102, 200, 302). In some embodiments, the host controller (e.g., 104, 262) may be configured to perform the operations by processor-executable instructions stored in a non-transitory processor-readable medium (e.g., 108, 220, 258, 320). Means for performing each of the operations of the method 600a and the operations 600b-600e may be a processor of the systems 100, 200, and 300 such as the processors 102, 252, 322, and/or the like as described with reference to FIGS. 1-6E.

In block 602, the host controller (e.g., 104, 262) of the computing device may (e.g., 102, 200, 302) perform operations including initiating read request from a file system. The read request initiation may include configuring the host controller to receive read requests (e.g., from a component of the SoC 102, 202 or a component or device communicatively connected to the SoC 102, 202 via I/O interface). Means for performing the operations of block 602 may include a host controller (e.g., 104, 262) of a computing device may (e.g., 102, 200, 302) executing the transmit-receive module 330.

Figure 6B:
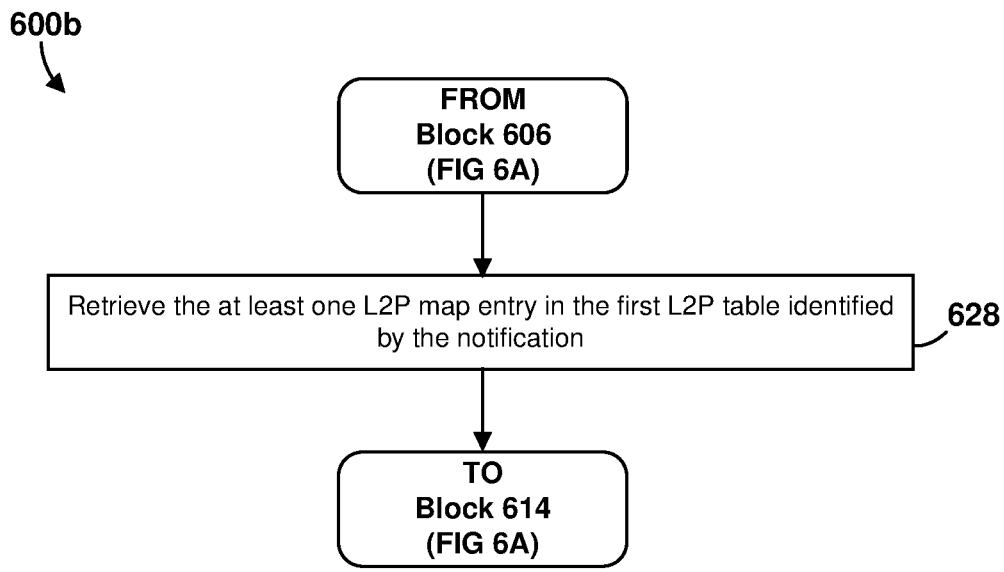
FIGS. 6B-6E are process flow diagrams of example operations that may be performed as part of the method illustrated in FIG. 6A as described for synchronizing L2P tables in accordance with some embodiments.

FIG. 6B illustrates operations 600b that may be performed as part of the method 600a for synchronizing L2P tables in accordance with some embodiments. With reference to FIGS. 1-6B, following the operations in block 606, the host controller (e.g., 104, 262) of the computing device may (e.g., 102, 200, 302) perform operations including retrieving at least one L2P map entry in the first L2P table (e.g., L2P-1) identified by a notification in block 628.

In some embodiments, the host controller may receive a notification indicating that at least one L2P map entry in the first L2P table is not synchronized with the at least one L2P map entry in the second L2P table (e.g., L2P-2). In some embodiments, the read message transmit to the UFS (e.g., 106) by the host controller may include at least one L2P map entry of the first L2P table. In some embodiments, the device controller may be configured to read the logical block data identified by the at least one L2P map entry of the first L2P table. Means for performing the operations of block 628 may include a host controller (e.g., 104, 262) of a computing device may (e.g., 102, 200, 302) executing the transmit-receive module 330.

Following the operations in block 628, the host controller may continue to perform operations as described in determination block 614.

Figure 6C:
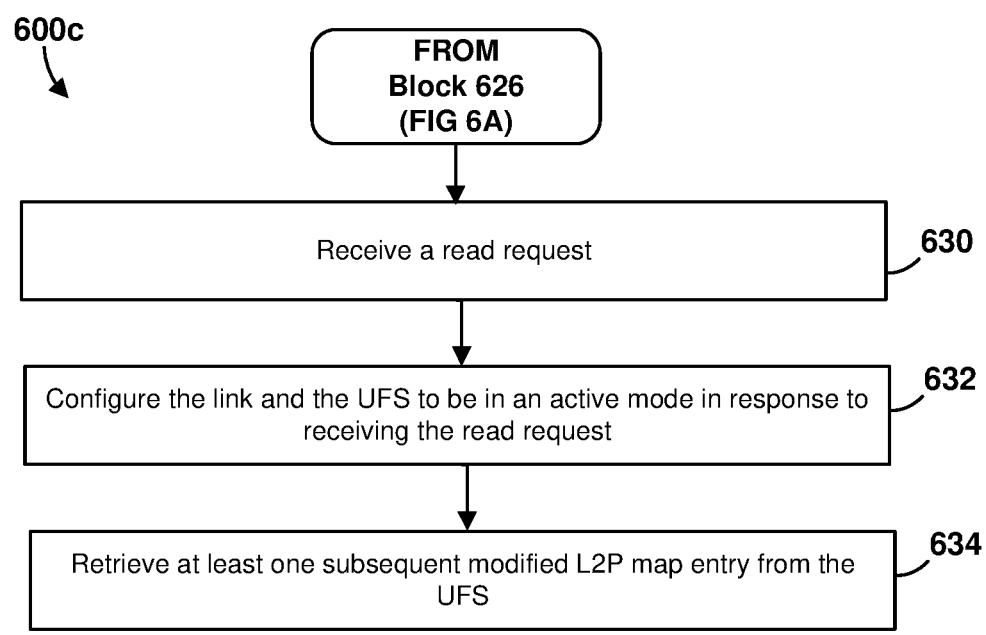

FIG. 6C illustrates operations 600c that may be performed as part of the method 600a for synchronizing L2P tables in accordance with some embodiments. With reference to FIGS. 1-6C, following the operations in block 626, the host controller (e.g., 104, 262) of the computing device may (e.g., 102, 200, 302) perform operations including receiving a read request in block 630. The read request may be received by the host controller from a component within the SoC (e.g., 102, 202) or from a device or component communicatively coupled to the SoC. Means for performing the operations of block 628 may include a host controller (e.g., 104, 262) of a computing device may (e.g., 102, 200, 302) executing the transmit-receive module 330.

In block 632, the host controller (e.g., 104, 262) of the computing device may (e.g., 102, 200, 302) perform operations including configuring the link (e.g., 114) and the UFS (e.g., 106) to be in an active mode in response to receiving the read request. The host controller 104 may wake or otherwise configure the link and the UFS to be in an active mode by providing power to power rails of the NAND memory (e.g., 112) (e.g., supply VCC with power) and the device controller (e.g., 116) (e.g., provide VCCQ/VCCQ2 with power). Means for performing the operations of block 628 may include a host controller (e.g., 104, 262) of a computing device may (e.g., 102, 200, 302) executing the hibernation module 334.

In block 634, the host controller (e.g., 104, 262) of the computing device may (e.g., 102, 200, 302) perform operations including retrieving at least one subsequent modified L2P map entry from the UFS. Means for performing the operations of block 628 may include a host controller (e.g., 104, 262) of a computing device may (e.g., 102, 200, 302) executing the hibernation module 334.

The processes described with reference to blocks 630-634 may be performed as part of the timing diagrams 500a and/or 500b to retrieve modified L2P map entries when the UFS is in a hibernation mode.

Figure 6D:
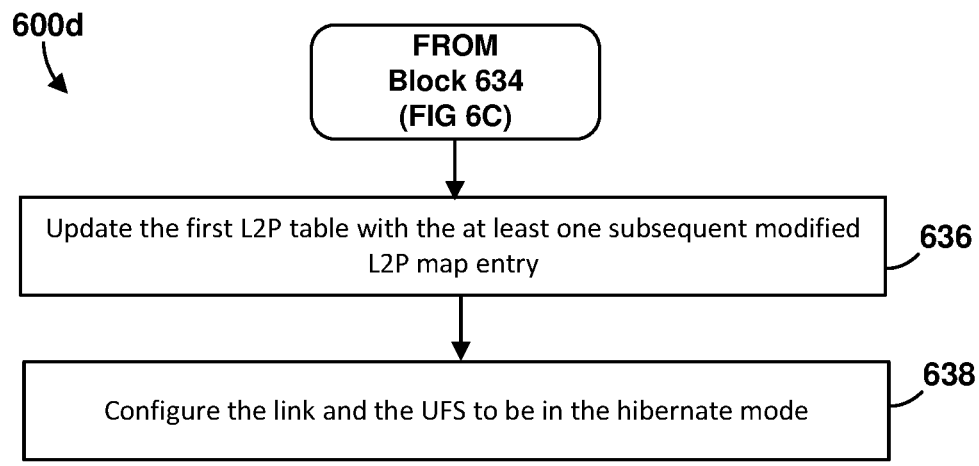

FIG. 6D illustrates operations 600d that may be performed as part of the method 600a for synchronizing L2P tables in accordance with some embodiments. With reference to FIGS. 1-6D, following the operations in block 634, the host controller (e.g., 104, 262) of the computing device may (e.g., 102, 200, 302) perform operations including updating the first L2P table (e.g., L2P-1) with the at least one subsequent modified L2P map entry in block 636. Means for performing the operations of block 636 may include a host controller (e.g., 104, 262) of a computing device may (e.g., 102, 200, 302) executing the DRAM update module 336.

In block 638, the host controller (e.g., 104, 262) of the computing device may (e.g., 102, 200, 302) perform operations including configuring the link (e.g., 114) and the UFS (e.g., 106) to be in a hibernation mode. Means for performing the operations of block 638 may include a host controller (e.g., 104, 262) of a computing device may (e.g., 102, 200, 302) executing the hibernation module 334.

Figure 6E:
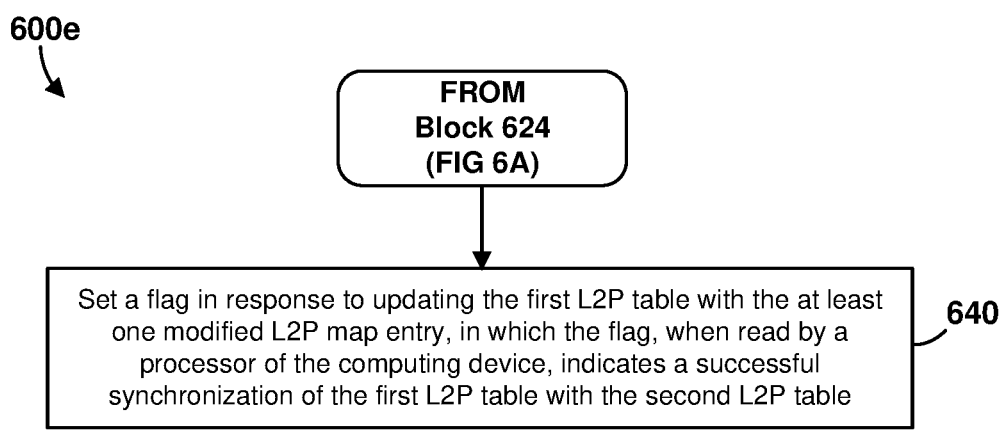

FIG. 6E illustrates operations 600e that may be performed as part of the method 600a for synchronizing L2P tables in accordance with some embodiments. With reference to FIGS. 1-6E, following the operations in block 624, the host controller (e.g., 104, 262) of the computing device may (e.g., 102, 200, 302) perform operations including setting a flag in response to updating the first L2P table (e.g., L2P-1) with the at least one modified L2P map entry, in which the flag, when read by a processor of the computing device, indicates a successful synchronization of the first L2P table with the second L2P table (e.g., L2P-2) in block 640. In some embodiments, the host controller may use a flag, a bit, and/or a number of flags or bits to indicate which, if any L2P mapped addresses have been synchronized or remain unsynchronized. In some embodiments, the flag(s) may indicate whether the UFS device is in a hibernate mode and if the second table was flushed to the host controller prior to hibernation of the UFS device. Means for performing the operations of block 640 may include a host controller (e.g., 104, 262) of a computing device may (e.g., 102, 200, 302) executing the sync check module 332.

Figure 7:
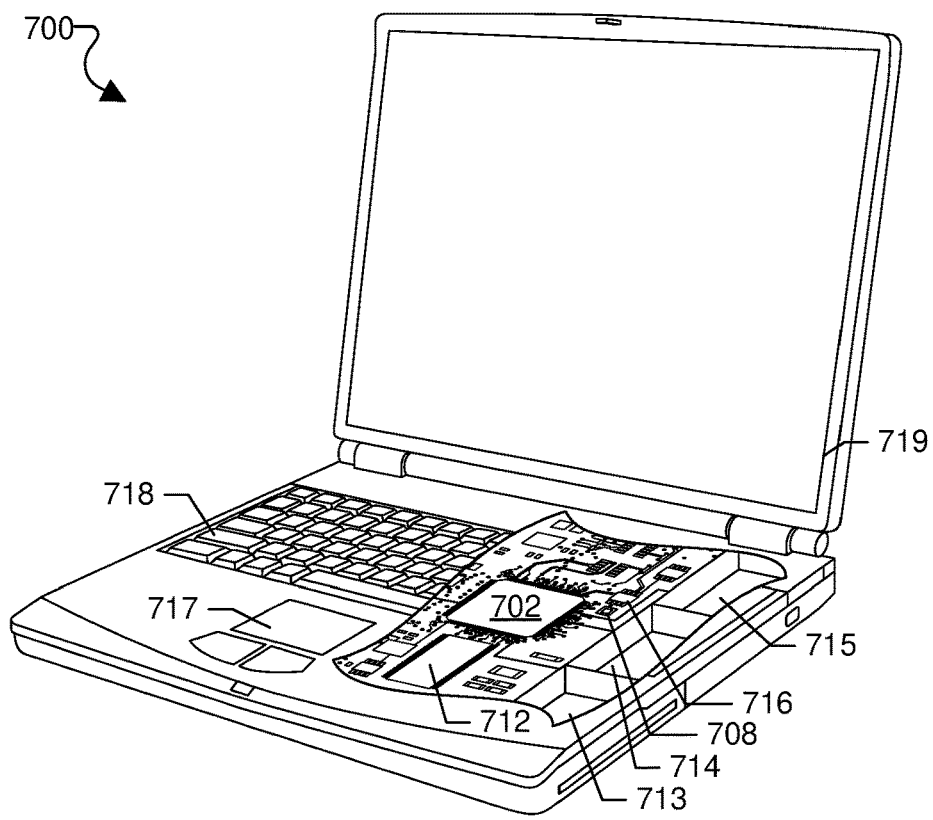
FIG. 7 is a component block diagram illustrating an example computing device suitable for use with the various embodiments.

The various embodiments (including, but not limited to, embodiments described above with reference to FIGS. 1-6E) may be implemented in a wide variety of computing systems include a laptop computer 700 an example of which is illustrated in FIG. 7. With reference to FIGS. 1-7, a laptop computer may include a touchpad touch surface 717 that serves as the computer's pointing device, and thus may receive drag, scroll, and flick gestures similar to those implemented on computing devices equipped with a touch screen display and described above. A laptop computer 700 will typically include a processor 702 coupled to volatile memory 712 and a large capacity nonvolatile memory, such as a disk drive 713 of Flash memory. Additionally, the computer 700 may have one or more antenna 708 for sending and receiving electromagnetic radiation that may be connected to a wireless data link and/or cellular telephone transceiver 716 coupled to the processor 702. The computer 700 may also include a floppy disc drive 714 and a compact disc (CD) drive 715 coupled to the processor 702. The laptop computer 700 may include a touchpad 717, a keyboard 718, and a display 719 all coupled to the processor 702. Other configurations of the computing device may include a computer mouse or trackball coupled to the processor (e.g., via a USB input) as are well known, which may also be used in conjunction with the various embodiments.

Figure 8:
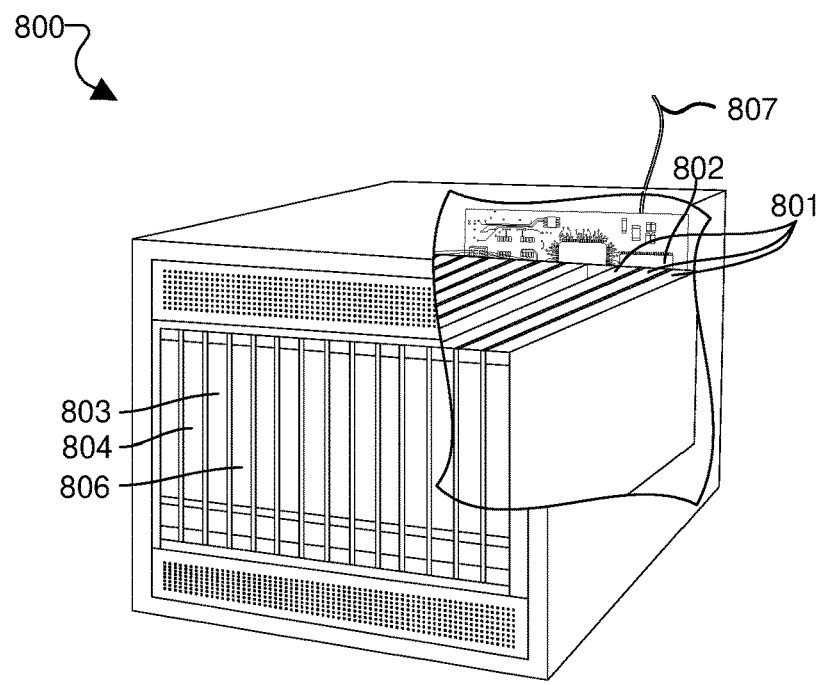
FIG. 8 is a component block diagram illustrating an example server suitable for use with the various embodiments.

FIG. 8 is a component block diagram of a computing device 800, such as a server, suitable for use with various embodiments. Such computing devices may include at least the components illustrated in FIG. 8. With reference to FIGS. 1-8, the computing device 800 may include a processor 801 coupled to volatile memory 802 and a large capacity nonvolatile memory, such as a disk drive 803.

The computing device 800 may also include a peripheral memory access device such as a floppy disc drive, compact disc (CD) or digital video disc (DVD) drive 806 coupled to the processor 801. The computing device 800 may also include network access ports 804 (or interfaces) coupled to the processor 801 for establishing data connections with a network, such as the Internet and/or a local area network coupled to other system computers and servers.

The computing device 800 may include one or more antennas 807 for sending and receiving electromagnetic radiation that may be connected to a wireless communication link. The computing device 800 may include additional access ports, such as USB, Firewire, Thunderbolt, and the like for coupling to peripherals, external memory, or other devices.

Figure 9:
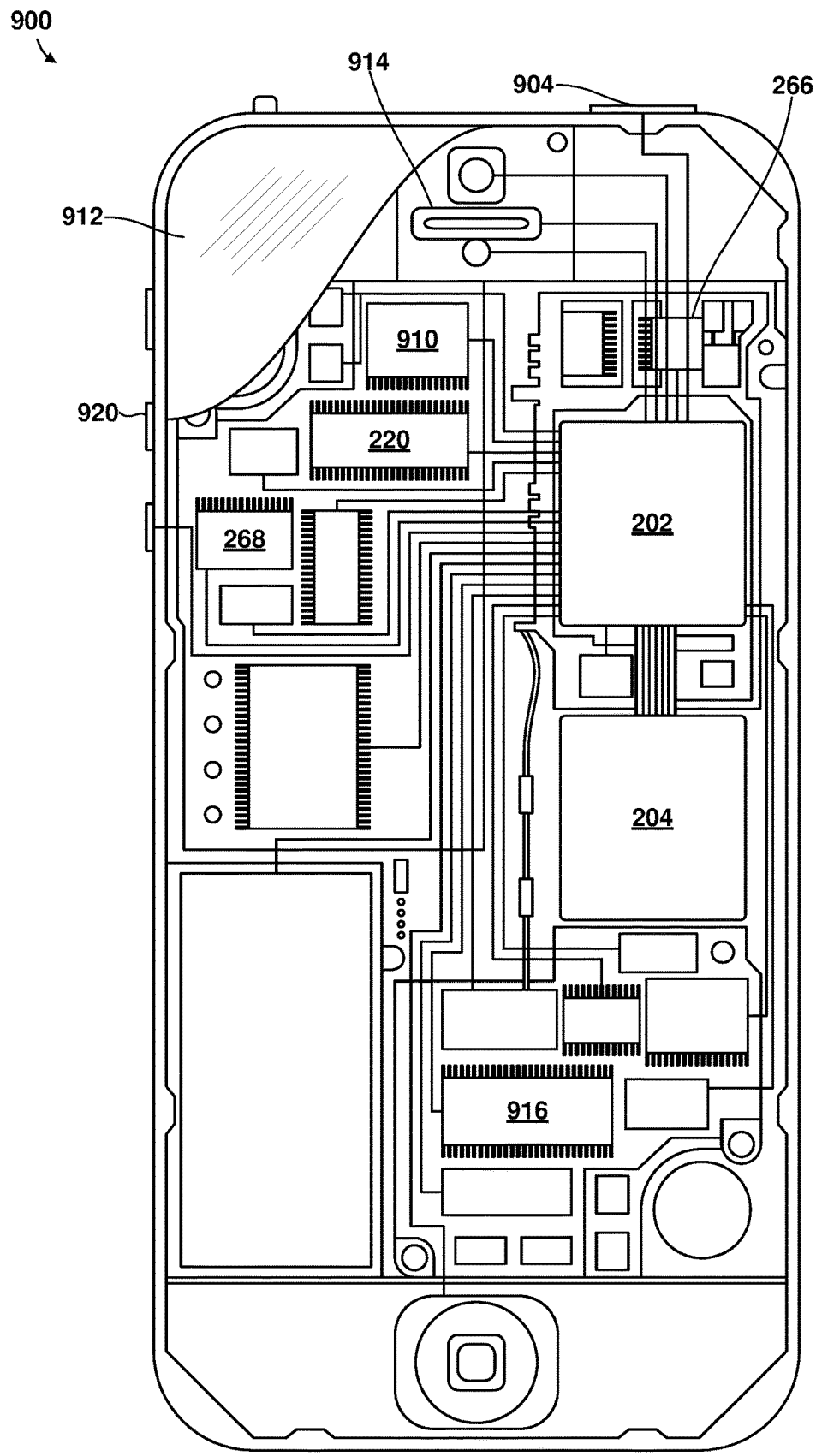
FIG. 9 is a component block diagram illustrating an example wireless communication device suitable for use with the various embodiments.

FIG. 9 is a component block diagram of a computing device 900 suitable for use with various embodiments. With reference to FIGS. 1-9, various embodiments may be implemented on a variety of computing devices 900 (e.g., computing device 100, 200, 320), an example of which is illustrated in FIG. 9 in the form of a smartphone. The computing device 900 may include a first SoC 202 (e.g., a SoC-CPU) coupled to a second SoC 204 (e.g., a 5G capable SoC). The first and second SoCs 202, 204 may be coupled to internal memory 916, a display 912, and to a speaker 914. The first and second SoCs 202, 204 may also be coupled to at least one SIM 268 and/or a SIM interface that may store information supporting a first 5GNR subscription and a second 5GNR subscription, which support service on a 5G non-standalone (NSA) network.

The computing device 900 may include an antenna 904 for sending and receiving electromagnetic radiation that may be connected to a wireless transceiver 266 coupled to one or more processors in the first and/or second SoCs 202, 204. The computing device 900 may also include menu selection buttons or rocker switches 920 for receiving user inputs.

The computing device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SoCs 202, 204, wireless transceiver 266 and CODEC 910 may include a digital signal processor (DSP) circuit (not shown separately).

The processors of the computer 700, the computing device 800, and the computing device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SoC 204 dedicated to wireless communication functions and one processor within an SoC 202 dedicated to running other applications. Software applications may be stored in the memory 220, 916 before they are accessed and loaded into the processor. The processors may include internal memory sufficient to store the application software instructions.

Implementation examples are described in the following paragraphs. While some of the following implementation examples are described in terms of example methods that may be performed in a computing device by a host controller, further example implementations may include: a computing device including a host controller configured to perform the methods of the following implementation examples; a computing device including means for performing functions of the following implementation examples, a host controller suitable for use in a computing device, in which the host controller includes a processor configured to perform the methods of the following implementation examples; and a non-transitory, processor-readable memory having stored thereon processor-executable instructions configured to cause a host controller in a computing device configured to perform the methods of the following implementation examples.

Example 1. A method performed by a host controller of a computing device for synchronizing logical-to-physical (L2P) tables, including: determining whether a first L2P table stored in a dynamic random-access memory (DRAM) communicatively connected to the host controller is out of synchronization with a second L2P table stored in a static random-access memory (SRAM) of a universal flash storage (UFS) device communicatively connected to the host controller via a link; determining whether the UFS device is configured to enter a hibernate mode in response to determining that the first L2P table is out of synchronization with the second L2P table; retrieving at least one modified L2P map entry from the UFS device in response to the UFS device being configured to enter the hibernate mode, in which the at least one modified L2P map entry is stored within the second L2P table; updating the first L2P table with the at least one modified L2P map entry; configuring the link and the UFS device to be in the hibernate mode.

Example 2. The method of example 1, in which determining whether the UFS device is configured to enter the hibernate mode further includes determining that the UFS device is configured to enter the hibernate mode further in response to a command queue of the host controller being empty.

Example 3. The method of either example 1 or 2, in which determining whether the first L2P table is out of synchronization with the second L2P table further includes determining that the first L2P table is out of synchronization with the second L2P table in response to receiving a notification indicating that the first L2P table is out of synchronization with the second L2P table.

Example 4. The method of example 3, in which retrieving the at least one modified L2P map entry from the UFS device further includes: transmitting, from the host controller to a device controller of the UFS device, a read message configured to cause the device controller to read logical block data from a NOT-AND (NAND) flash memory within the UFS device, in which the logical block data is associated with the at least one modified L2P map entry; receiving the logical block data from the device controller, in which updating the first L2P table with the at least one modified L2P map entry further includes updating the first L2P table based on the logical block data.

Example 5. The method of example 4, in which the notification further indicates at least one L2P map entry in the first L2P table that is not synchronized with the at least one L2P map entry in the second L2P table, the method further including retrieving the at least one L2P map entry in the first L2P table identified by the notification, in which the read message includes the at least one L2P map entry of the first L2P table, in which the device controller is configured to read the logical block data identified by the at least one L2P map entry of the first L2P table.

Example 6. The method of any of examples 1-5, further including:
receiving a read request; configuring the link and the UFS device to be in an active mode in response to receiving the read request; retrieving at least one subsequent modified L2P map entry from the UFS device.

Example 7. The method of example 6, further including: updating the first L2P table with the at least one subsequent modified L2P map entry; configuring the link and the UFS device to be in the hibernate mode.

Example 8. The method of any of examples 1-7, further including setting a flag in response to updating the first L2P table with the at least one modified L2P map entry, in which the flag, when read by a processor of the computing device, indicates a successful synchronization of the first L2P table with the second L2P table.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), Long Term Evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A computing device, comprising:
    a dynamic random-access memory (DRAM);
    a static random-access memory (SRAM) of a universal flash storage (UFS) device; and
    a host controller communicatively connected to the DRAM and to the SRAM via a link, wherein the host controller is configured to:
        determine whether a first logical-to-physical (L2P) L2P table stored in the DRAM is out of synchronization with a second L2P table stored in the SRAM;
        determine whether the UFS device is configured to enter a hibernate mode in response to determining that the first L2P table is out of synchronization with the second L2P table;
        retrieve at least one modified L2P map entry from the UFS device in response to the UFS device being configured to enter the hibernate mode, wherein the at least one modified L2P map entry is stored within the second L2P table;
        update the first L2P table with the at least one modified L2P map entry; and
        configure the link and the UFS device to be in the hibernate mode.

2. The computing device of claim 1, wherein the host controller is further configured so as to determine whether the UFS device is configured to enter the hibernate mode in response to a command queue of the host controller being empty.

3. The computing device of claim 1, wherein the host controller is further configured to determine that the first L2P table is out of synchronization with the second L2P table in response to receiving a notification indicating that the first L2P table is out of synchronization with the second L2P table.

4. The computing device of claim 3, wherein the host controller is further configured to retrieve the at least one modified L2P map entry from the UFS device further by:
    transmitting, to a device controller of the UFS device, a read message configured to cause the device controller to read logical block data from a NOT-AND (NAND) flash memory within the UFS device, wherein the logical block data is associated with the at least one modified L2P map entry; and
    receiving the logical block data from the device controller, wherein the host controller is further configured to update the first L2P table with the at least one modified L2P map entry based on the logical block data.

5. The computing device of claim 4, wherein:
the notification further indicates at least one L2P map entry in the first L2P table that is not synchronized with the at least one L2P map entry in the second L2P table;
the host controller is further configured to retrieve the at least one L2P map entry in the first L2P table identified by the notification;
the read message includes the at least one L2P map entry of the first L2P table; and
the device controller is configured to read the logical block data identified by the at least one L2P map entry of the first L2P table.

6. The computing device of claim 1, wherein the host controller is further configured to:
receive a read request;
configure the link and the UFS device to be in an active mode in response to receiving the read request; and
retrieve at least one subsequent modified L2P map entry from the UFS device.

7. The computing device of claim 6, wherein the host controller is further configured to:
update the first L2P table with the at least one subsequent modified L2P map entry; and
configure the link and the UFS device to be in the hibernate mode.

8. The computing device of claim 1, wherein the host controller is further configured to set a flag in response to updating the first L2P table with the at least one modified L2P map entry, wherein the flag, when read by a processor of the computing device, indicates a successful synchronization of the first L2P table with the second L2P table.

9. A method performed by a host controller of a computing device for synchronizing logical-to-physical (L2P) tables, comprising:
determining whether a first L2P table stored in a dynamic random-access memory (DRAM) communicatively connected to the host controller is out of synchronization with a second L2P table stored in a static random-access memory (SRAM) of a universal flash storage (UFS) device communicatively connected to the host controller via a link;
determining whether the UFS device is configured to enter a hibernate mode in response to determining that the first L2P table is out of synchronization with the second L2P table;
retrieving at least one modified L2P map entry from the UFS device in response to the UFS device being configured to enter the hibernate mode, wherein the at least one modified L2P map entry is stored within the second L2P table;
updating the first L2P table with the at least one modified L2P map entry; and
configuring the link and the UFS device to be in the hibernate mode.

10. The method of claim 9, wherein determining whether the UFS device is configured to enter the hibernate mode further comprises determining that the UFS device is configured to enter the hibernate mode further in response to a command queue of the host controller being empty.

11. The method of claim 9, wherein determining whether the first L2P table is out of synchronization with the second L2P table further comprises determining that the first L2P table is out of synchronization with the second L2P table in response to receiving a notification indicating that the first L2P table is out of synchronization with the second L2P table.

12. The method of claim 11, wherein retrieving the at least one modified L2P map entry from the UFS device further comprises:
transmitting, from the host controller to a device controller of the UFS device, a read message configured to cause the device controller to read logical block data from a NOT-AND (NAND) flash memory within the UFS device, wherein the logical block data is associated with the at least one modified L2P map entry; and
receiving the logical block data from the device controller,
wherein updating the first L2P table with the at least one modified L2P map entry further comprises updating the first L2P table based on the logical block data.

13. The method of claim 12, wherein the notification further indicates at least one L2P map entry in the first L2P table that is not synchronized with the at least one L2P map entry in the second L2P table,
the method further comprising retrieving the at least one L2P map entry in the first L2P table identified by the notification,
wherein the read message includes the at least one L2P map entry of the first L2P table, and
wherein the device controller is configured to read the logical block data identified by the at least one L2P map entry of the first L2P table.

14. The method of claim 9, further comprising:
receiving a read request;
configuring the link and the UFS device to be in an active mode in response to receiving the read request; and
retrieving at least one subsequent modified L2P map entry from the UFS device.

15. The method of claim 14, further comprising:
updating the first L2P table with the at least one subsequent modified L2P map entry; and
configuring the link and the UFS device to be in the hibernate mode.

16. The method of claim 9, further comprising setting a flag in response to updating the first L2P table with the at least one modified L2P map entry, wherein the flag, when read by a processor of the computing device, indicates a successful synchronization of the first L2P table with the second L2P table.

17. A computing device, comprising:
a dynamic random-access memory (DRAM);
a static random-access memory (SRAM) of a universal flash storage (UFS) device;
means for determining whether a first logical-to-physical (L2P) table stored in the DRAM is out of synchronization with a second L2P table stored in the SRAM;
means for determining whether the UFS device is configured to enter a hibernate mode in response to determining that the first L2P table is out of synchronization with the second L2P table;
means for retrieving at least one modified L2P map entry from the UFS device in response to the UFS device being configured to enter the hibernate mode, wherein the at least one modified L2P map entry is stored within the second L2P table;
means for updating the first L2P table with the at least one modified L2P map entry; and
means for configuring the UFS device and a link of the UFS device to the computing device to be in the hibernate mode.

18. The computing device of claim 17, wherein means for determining whether the UFS device is configured to enter the hibernate mode further comprises means for determining that the UFS device is configured to enter the hibernate mode further in response to a command queue of a being empty.

19. The computing device of claim 17, wherein means for determining whether the first L2P table is out of synchronization with the second L2P table further comprises means for determining that the first L2P table is out of synchronization with the second L2P table in response to receiving a notification indicating that the first L2P table is out of synchronization with the second L2P table.

20. The computing device of claim 19, wherein means for retrieving the at least one modified L2P map entry from the UFS device further comprises:
means for transmitting, to a device controller of the UFS device, a read message configured to cause the device controller to read logical block data from a NOT-AND (NAND) flash memory within the UFS device, wherein the logical block data is associated with the at least one modified L2P map entry; and
means for receiving the logical block data from the device controller, wherein means for updating the first L2P table with the at least one modified L2P map entry further comprises means for updating the first L2P table based on the logical block data.

21. The computing device of claim 20, wherein:
the notification further indicates at least one L2P map entry in the first L2P table that is not synchronized with the at least one L2P map entry in the second L2P table;
the read message includes the at least one L2P map entry of the first L2P table; and
the computing device further comprises:
means for retrieving the at least one L2P map entry in the first L2P table identified by the notification; and
means for reading the logical block data identified by the at least one L2P map entry of the first L2P table.

22. The computing device of claim 17, further comprising:
means for receiving a read request;
means for configuring the link and the UFS device to be in an active mode in response to receiving the read request; and
means for retrieving at least one subsequent modified L2P map entry from the UFS device.

23. The computing device of claim 6, further comprising:
means for updating the first L2P table with the at least one subsequent modified L2P map entry; and
means for configuring the link and the UFS device to be in the hibernate mode.

24. The computing device of claim 17, further comprising means for setting a flag in response to updating the first L2P table with the at least one modified L2P map entry, wherein the flag, when read by a processor of the computing device, indicates a successful synchronization of the first L2P table with the second L2P table.

25. A host controller for use in a computing device, the host controller comprising a processor configured to:
determine whether a first L2P table stored in a dynamic random-access memory (DRAM) communicatively connected to the host controller is out of synchronization with a second L2P table stored in a static random-access memory (SRAM) of a universal flash storage (UFS) device communicatively connected to the host controller via a link;
determine whether the UFS device is configured to enter a hibernate mode in response to determining that the first L2P table is out of synchronization with the second L2P table;
retrieve at least one modified L2P map entry from the UFS device in response to the UFS device being configured to enter the hibernate mode, wherein the at least one modified L2P map entry is stored within the second L2P table;
update the first L2P table with the at least one modified L2P map entry; and
configure the link and the UFS device to be in the hibernate mode.

26. The host controller of claim 25, wherein the processor is further configured to determine that the first L2P table is out of synchronization with the second L2P table in response to receiving a notification indicating that the first L2P table is out of synchronization with the second L2P table.

27. The host controller of claim 26, wherein the processor is further configured to retrieve the at least one modified L2P map entry from the UFS device by:
transmitting, to a device controller of the UFS device, a read message configured to cause the device controller to read logical block data from a NOT-AND (NAND) flash memory within the UFS device, wherein the logical block data is associated with the at least one modified L2P map entry; and
receiving the logical block data from the device controller,
wherein the processor is further configured to update the first L2P table with the at least one modified L2P map entry based on the logical block data.

28. The host controller of claim 27, wherein:
the notification further indicates at least one L2P map entry in the first L2P table that is not synchronized with the at least one L2P map entry in the second L2P table;
the read message includes the at least one L2P map entry of the first L2P table; and
the processor is further configured to:
retrieve the at least one L2P map entry in the first L2P table identified by the notification; and
read the logical block data identified by the at least one L2P map entry of the first L2P table.

29. The host controller of claim 25, wherein the processor is further configured to:
receive a read request;
configure the link and the UFS device to be in an active mode in response to receiving the read request; and
retrieve at least one subsequent modified L2P map entry from the UFS device.

30. The host controller of claim 29, wherein the processor is further configured to:
update the first L2P table with the at least one subsequent modified L2P map entry; and
configure the link and the UFS device to be in the hibernate mode.

* * * * *